United States Patent Office 3,043,807
Patented July 10, 1962

---

3,043,807
POLYURETHANE ELASTOMERS
Carl E. Snyder, Cuyahoga Falls, Nelson V. Seeger, Painesville, Ernest E. Fauser, Cuyahoga Falls, and Anthony F. Finelli and John A. Lovell, Akron, Ohio, assignors to The Goodyear Tire & Rubber Company, Akron, Ohio, a corporation of Ohio
No Drawing. Filed Jan. 27, 1958, Ser. No. 711,147
11 Claims. (Cl. 260—75)

This invention relates to improved polyurethane elastomers and to methods for their preparation. More particularly, it relates to polyurethane elastomers which are capable of being cured by means of sulfur and which are capable of being cured by means of sulfur and which are prepared from active-hydrogen-containing linear polymers, organic diisocyanates and, optionally, a third bifunctional reactant.

The development of rubber products, both solid and cellular, from polyurethanes prepared from the reaction of active-hydrogen-containing linear polymers such as polyesters or polyesteramides and diisocyanates has been extensively pursued in recent years. By the term "active-hydrogen" used to describe the linear polymers employed in the practice of this invention is meant those hydrogen atoms which are reactive as measured and determined by the Zerewitinoff method which includes the hydrogen atoms present in such radicals as the hydroxyl, carboxyl, and thiol radicals. The physical properties of the urethane rubbers, particularly in regard to tensile strength and abrasion resistance, have stimulated interest in the use of these rubbers for many industrial applications. In the fabrication of some products from polyurethanes it is possible and even advantageous to process the reactants in the form of liquids. For instance, polyurethane foam products are prepared in this manner, as well as solid molded articles which can be molded directly from the liquid reaction mixture. When, however, the liquid reaction mixture which produces the polyurethane rubber has to be converted into a solid "uncured" rubber for processing on conventional rubber fabrication equipment such as mix mills or calenders, the chemical nature of the reactants employed to prepare the rubber creates certain problems.

A polyisocyanate, and usually a diisocyanate, is employed to chain-extend the active-hydrogen-containing linear polymer as well as to react with the active-hydrogen atoms along the chain-extended molecule forming cross-links between chains, which cross-linking reaction is generally referred to as curing or vulcanization. One approach to the problem of producing a processible polyurethane rubber which can be subsequently cured by means of a polyisocyanate is described in United States Patents 2,625,531; 2,625,532; 2,625,535; 2,760,953 and 2,777,831. As described therein, controlled amounts of specific diisocyanates are reacted with polyesters and polyesteramides to produce solid rubbers which can be compounded and processed in the same manner as unvulcanized natural rubber. One advantage of this type of polyurethane rubber is that it can be stored in the unvulcanized state for extended periods of time until it is to be compounded and processed into a finished product. During compounding, additional polyisocyanate, which functions as a curing agent, is mixed with the unvulcanized rubber. Following the addition of this second increment of curative polyisocyanate, the rubber must be processed into an article ready for curing within a relatively short time because the reactivity of the isocyanate and the exposure of the fully compounded rubber to the accelerative effect of atmospheric moisture contribute to the rather rapid "setting up" of the fully compounded rubber.

It is the broad object of this invention to provide solid unvulcanized polyurethane rubbers which, even after the vulcanizing agents have been added thereto, can be stored for extended periods of time without prematurely vulcanizing. Another object is to provide such compounded solid polyurethane rubbers which can be fabricated into uncured products capable of being stored, if desired, for extended periods of time after fabrication and before vulcanization. An additional object is to provide solid unvulcanized polyurethane elastomers which, after curing agents have been added thereto, are not as sensitive to heat and atmospheric moisture as are the known isocyanate-curable polyurethane rubbers. Another object is to provide polyurethane elastomers which can be vulcanized to possess outstanding physical properties and which employ chemical vulcanization systems less expensive than the isocyanate system conventionally employed to vulcanize such elastomers. Still another object is to provide vulcanization systems for polyurethane elastomers which are chemically more compatible with those conventionally employed with natural rubber and the synthetic elastomeric co-polymers of butadiene and styrene. Another object is to provide liquid or liquifiable unvulcanized vulcanizable polyurethane reaction mixtures which are either liquids at room temperature or capable of being melted at relatively low temperatures, which can be stored for extended periods of time without prematurely vulcanizing and which, without adding other ingredients can be heated, if necessary, to make films, coatings or molded products directly from the liquid state. Other objects will appear as the description proceeds.

These and other objects of the invention are accomplished by building into the polyurethane product a pendant or extra-linear group which contains an aliphatic non-benzenoid

group, and preferably a

group, capable of reacting with and being cross-linked or vulcanized by reaction with such curing agents as sulfur or peroxides. Various means are employed to build the pendant-unsaturation-containing component into the polyurethane product.

For instance, pendant unsaturation can be built into a linear polyester before that polyester is modified by the diisocyanate. By way of example, a dibasic acid or a glycol, or both, or a linear ester of either containing extra-linear pendant unsaturation can be esterified to produce a linear polyester containing pendant unsaturation in either or both of the acid or glycol moieties of the resulting linear polyester.

Alternatively, an active-hydrogen-containing linear polyester containing no pendant unsaturation can be modified by the diisocyanate in the presence of a third component which contains extra-linear pendant unsaturation and which contains two groups capable of reaction with either the diisocyanate or the terminal groups of the linear polyester or both, examples of such third components being glycols, dicarboxylic acids, or polyesters which contain pendant unsaturation. In addition, an active-hydrogen-containing linear polyester which itself contains no pendant unsaturation can be initially reacted with a diisocyanate to form an isocyanate-terminated linear polyester which is then reacted with a third bi-functional reactant such as a glycol, a dicarboxylic acid or a polyester which contains the pendant unsaturation to yield an extended linear polyurethane molecule with groups containing pendant unsaturation spaced along the polymer chain. Also, the unvulcanized polyurethane elastomers of this invention can be prepared by employing a diisocyanate which contains the extra-linear unsaturation. Combinations of two or more of these approaches to "building in" the extra-linear unsaturation represent other modifications employed to prepare the elastomers of this invention.

It has been found that elastomers having outstanding physical properties and which require the use of the least amount of the relatively expensive diisocyanate are advantageously prepared from active-hydrogen-containing linear polyesters into which pendant unsaturation has been incorporated. This method is preferred since none of the comparatively expensive diisocyanate reactant is required to act as the bridging component for the third component which would otherwise have to be employed to incorporate the desired pendant unsaturation into the modified polymer.

When the pendant unsaturation is built into the polyester itself, the elastomeric reaction product of this invention may be described essentially as containing recurring structural units of the formula

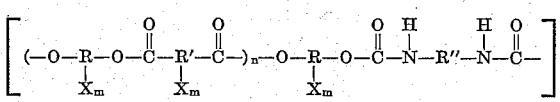

wherein —O—R—O is a bivalent radical resulting from the elimination of terminal hydrogen atoms of a glycol;

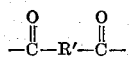

is a radical resulting from the elimination of terminal hydroxyl groups of a dibasic carboxylic acid;

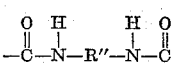

is a bivalent radical resulting from the addition of two urethane hydrogen atoms to a diisocyanate; $n$ is a whole number of such magnitude that the molecular weight of the polyester segment is from 900 to 5000; X is a radical containing an aliphatic non-benzenoid

group; $m$ is a whole number including zero and not more than $X_m$ group is attached to a given carbon atom in the radical to which they are attached; the number of X radicals in the molecular structure being such that there is at least one such non-benzenoid aliphatic

group for each 6000 units of molecular weight of said elastomeric reaction product, it having been found that if this indicated minimum of

groups is not present in the polymer molecule, the resulting material does not respond to sulfur cure sufficiently to produce the outstanding properties desired in the cured material.

When the pendant or extra-linear unsaturation is built into the polymer through the use of a third bifunctional component, the isocyanate groups of the diisocyanate or the terminal hydroxyl or carboxyl groups of the polyester or both react with the functional groups in the third component locating it in and along the polymer chain. If the diisocyanate, polyester and third component are reacted together simultaneously, a so-called random polymer results with the pendant unsaturation being "randomly" located along the polymer chain. As indicated above, it is possible and often desirable to tailor the polymer by first reacting the polyester with the diisocyanate to form an isocyanate-terminated polyester and then adding the third component carrying the pendant unsaturation with the modified polymer. In this manner it is possible to space the unsaturated groups more evenly along the polymer chain.

An alternative method of building the desired pendant unsaturation into the elastomeric polymers of this invention is to react an acid anhydride containing the unsaturation with a hydroxyl-terminated polyester and to react the acid-terminated polyester thus formed with ethylene oxide to produce a hydroxyl-terminated polyester containing the desired unsaturation. This, in turn, is reacted with an approximately equal molecular amount of diisocyanate to yield the unvulcanized elastomer. This method can be illustrated by the following equations

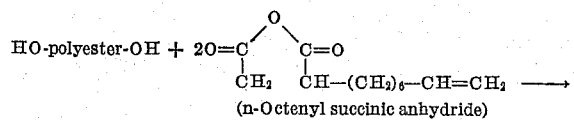

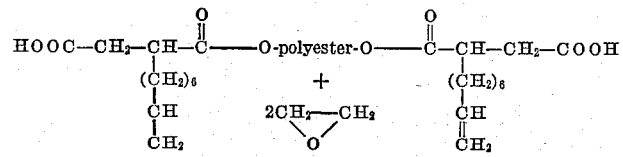

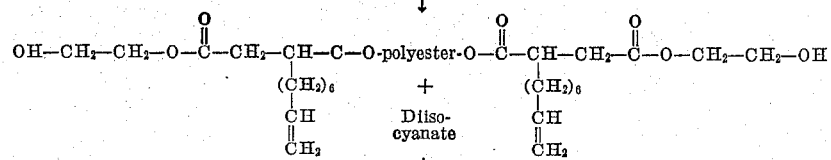

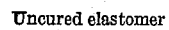

Uncured elastomer

In providing sufficient crosslink points for reaction with sulfur to develop the desired physical properties in the cured material, it has been found that at least one group containing pendant unsaturation must be present in the uncured material for each 6000 units of molecular weight of the reaction product. It is preferred that at least one such pendant group be present for each 1000 to 2000 molecular weight units of the reaction product. It should be apparent that the degree of unsaturation present can be varied by adjusting the amount of bifunctional reactant containing the unsaturation employed either to prepare the polyester itself or as a third component in the reaction between the polyester and the diisocyanate. For instance, a polyester prepared from adipic acid and a mixture of glycols containing 90 molar percent of ethylene glycol and 10 mol percent glycerol-alpha-allyl ether will, if reacted to a molecular weight of approximately 2000, provide an elastomeric product (after reaction with the diisocyanate) which will contain approximately one pendant group per each 2000 molecular weight of the product. A similar polyester prepared from a mixture of glycols in which the glycerol-alpha-allyl ether is increased to 20 mol percent will provide approximately one pendant group for each 1000 molecular weight units of the reaction product. It should be evident that the actual number of pendant groups can be computed from the molecular weight of the reactants and the molecular weight of the polyester. If the bifunctional reactant containing the pendant unsaturation is employed as a third component in the reaction with the diisocyanate, the number of pendant groups in the product resulting can be readily computed from the molecular weight of the polyester, the molecular weight of the specific bifunctional reactant, the molecular weight of the diisocyanate and the weight ratios of these reactants employed to produce the elastomer.

A wide variety of bifunctional reactants containing extra-linear pendant unsaturation may be employed either in the preparation of the polyester itself or as a third component in the reaction to build in the desired unsaturation. These bifunctional reactants must, in addition to possessing extra-linear unsaturation, contain two groups reactive with the isocyanate radical. Examples of such reactive groups are the hydroxyl group, the carboxyl group, the thiol group and the primary and secondary amino groups. These compounds may be defined by the formula $$X-R-Y$$
$$\phantom{X-R}|$$
$$\phantom{X-R-}Z$$

in which R is an organic radical inert with respect to isocyanate groups, X and Y are selected from the group consisting of —NH$_2$;

—OH; —COOH; and —SH and Z is an organic radical containing the aliphatic non-benzenoid

group. Specific examples of Z are —CH=CH$_2$;

—CH$_2$CH=CH$_2$; —CH$_2$—CH=CH—CH$_3$;
—CH$_2$—CH$_2$—CH=CH$_2$; —(CH$_2$)$_n$—CH=CH$_2$ in which n is a whole number from 1 to 10;
—O—CH$_2$—CH=CH$_2$; —CH$_2$—O—CH$_2$—CH=CH$_2$;

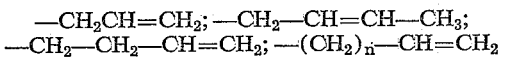

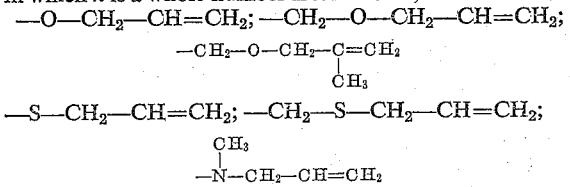

Representative examples of specific bifunctional reactants containing extra-linear pendant unsaturation are:

(1) The hydroxyl compounds such as erythrol, glycerol-mono-allyl ether, glycerol-alpha-allyl ether, allyl ethylene glycol, allyl propylene glycol, bis hydroxyethyl allyloxy succinate, pentaerythritol diallyl ether, vinyl cyclohexane diol, N,N-di(hydroxyethyl) allyl carbamate, dihydroxyethyl ether of 2-allyl hydroquinone; 2,2'-dialiyl P,P' bisphenol.

(2) The dicarboxylic acids such as allyl succinic acid, allyloxysuccinic acid, methallyl succinic acid, and n-octenyl succinic acid.

The preferred bifunctional reactants containing extra-linear pendant unsaturation are those which contain the unsaturation as a terminal —CH=CH$_2$ group which is more reactive with sulfur and which permits a more effective cross-linking or cure of the polymer.

In addition to the pendant-unsaturation-containing reactants described above, other glycols and dicarboxylic acids or mixtures thereof may be employed to prepare the polyesters used in the practice of this invention. Representative glycols are ethylene glycol; diethylene glycol; propylene glycol-1,2; propylene glycol-1,3; butylene glycol-1,4; pentane diol-1,5; decamethylene glycol and N,N-diethanolaniline. Representative acids are those containing at least three carbon atoms such as malonic, succinic, glutaric, adipic, pimelic, suberic, azelaic, sebacic, isophthalic, tetrahydrophthalic, hexahydrophthalic, terephthalic and hexahydroterephthalic.

Preferred polyesters are those prepared from adipic acid and ethylene glycol; propylene glycol-1,2; butylene glycol-1,4; or mixtures of these glycols.

The polyesters are prepared by the conventional condensation reaction between the glycol and the acid with the elimination of water. In order to provide polyesters which are predominantly hydroxyl-terminated and which in no event have acid numbers greater than 5, an excess of glycol (from 10 to 40%) is employed. The polyesters should have an average molecular weight of from 900 to 5000 and preferably from 1500 to 2500.

Any of a wide variety of organic diisocyanates may be employed to prepare the polymers of this invention including aromatic, aliphatic and cycloaliphatic diisocyanates and mixtures of two or more of these. Representative compounds include the meta tolylene diisocyanates such as 2,4-tolylene diisocyanate and 2,6-tolylene diisocyanate; m-phenylene diisocyanate; 4,4'-diphenylene diisocyanate; 4,4'-diphenylene methane diisocyanate; 1,5-naphthylene diisocyanate; dianisidine diisocyanate; 4,4'-tolidine diisocyanate; 4,4'-diphenyl ether diisocyanate; 1,4-tetramethylene diisocyanate; 1,6-hexamethylene diisocyanate; 1,10-decamethylene diisocyanate; 1,4-cyclohexylene diisocyanate; 4,4'-methylene-bis-(cyclohexyl isocyanate) and 1,5-tetrahydronaphthylene diisocyanate. Of these the aromatic isocyanates, and particularly the tolylene diisocyanates, 4,4'-tolidine diisocyanate and 4,4'-diphenylene methane diisocyanate are preferred. The diisocyanates may contain other substituents such as alkyl or halogen but should contain no groups such as hydroxyl or amino groups which are reactive with the isocyanate radicals.

In preparing the elastomers of this invention from the polyester, the diisocyanate and, optionally, the third component containing the pendant unsaturation, it is necessary to provide the diisocyanate in a molecular amount approximately equivalent to the molecular sum of the polyester and the third component, if present. A ratio of from 0.95 to 1.05 mols of diisocyanate to 1 mol of the other components has been found to produce the desired processing characteristics in the resulting unvulcanized polymer. For best processing properties, it is preferred that a very small molecular deficiency of diisocyanate be employed. In particular, if only the diisocyanate and polyester are reacted, the preferred amount of diisocyanate is 0.99 mol per mol of polyester. If a three-component system is employed, the amount of diisocyanate preferably is equal to the sum of 0.99 mol per mol of polyester plus the molecular amount of the third component employed. It has been found that, if substantially less than 0.95 or substantially more than 1.05 mols of diisocyanate per mol of polyester is employed the unvulcanized rubber is either too soft or too tough to provide completely satisfactory processing on conventional rubber-fabricating equipment such as mills or calenders, with the softer rubbers being obtained with the smaller amounts of diisocyanate. Also any diisocyanate in excess of the recommended substantially equal molecular amounts is available to function as cross-linker for the polymer, cutting down on the desired storage life of both the liquid and solid polymer products.

Depending upon whether the rubber is prepared from a two-component system (i.e. the diisocyanate and a polyester into which the desired pendant unsaturation has been built) or is prepared from a three-component system in which all or a part of the desired pendant unsaturation is built into the unvulcanized polymer through the use of a third bifunctional reactant containing the desired pendant unsaturation, the actual method of preparing the rubber will be varied. For instance, in the two-component system a dried polyester containing built in pendant unsaturation is heated with adequate agitation to a temperature of from approximately 170° F. to 185° F. The approximately equal molecular amount of diisocyanate is added to the polyester along with, optionally, a stabilizer for the double bonds such as phenyl-beta-naphthylamine and the heating is continued for from 10 to 30 minutes at a temperature of from 175° F. to 195° F., the extent of heating and the exact operating temperature depending upon the rate of reaction between the diisocyanate and the polyester. The reaction mixture is then poured into a tray or mold which has been previously coated with a mold release agent such as carnauba wax or silicone oil. The mold or tray is placed in an air oven and heated at elevated temperatures ranging from 125° F. to 300° F., preferably from 175° F. to 230° F. Here again the operating temperature of the oven and the actual time of heating will depend upon the rate of reaction between the diisocyanate and the polyester.

The oven bake of the reaction product is continued until the polymer has reached a plasticity suitable for processing on conventional machinery used in fabricating rubber products. A convenient method for determining the plasticity of the polymer is to subject it to a flow test (referred to in the examples below as Olsen flow) similar to that described as A.S.T.M. D569-48. A sample of the uncured polymer (½ inch long and slightly less than ⅜ inch diameter) is prepared and inserted into a Rossi-Peakes flow tester. After heating the sample 1 minute at 212° F., it is extruded through a ⅛ inch orifice under a pressure of 500 pounds per square inch. After 2 minutes, the length of extrudate is measured. Based on this two minute measurement, the Olsen flow values are then calculated and reported as the number of seconds which would be required to extrude 1 inch of the polymer. For satisfactory processing the polymers of this invention should have Olsen flow values of from 80 to 480 and preferably from 100 to 150 seconds per inch.

After the reaction mixture has attained the desired plasticity, the rubber is removed from the oven and, if desired, stabilizers such as ethyl para-amino benzoate or phenyl beta naphthylamine are added. The aminobenzoate stabilizes the polymer against molecular weight change while the tertiary amine stabilizes the double bonds in the polymer.

Alternative methods are available in the preparation of the rubber employing the three-component system. If an "ordered" type of rubber is to be prepared, the polyester is reacted with 2 mols of diisocyanate per mol of polyester in the same general manner as the method describing the two-component system. The prepolymer reaction mixture is heated at approximately 200° F. for a sufficient time (approximately 10 to 30 minutes) to reach a viscosity of approximately 5000 centipoises at 200° F., after which the third component (1 mol per mol of polyester) is added to the isocyanate-terminated polyester. Heating at approximately 200° F. is continued until the viscosity of the reaction mixture attains approximately 7000 centipoises at 200° F. This reaction mixture is then poured into a coated tray or mold and heated in the same manner as described for the two-component system to produce the desired unvulcanized rubber. Here again stabilizers may be added if desired.

The alternative method for preparing the rubber from the three-component system is to prepare a "random" polymer. The dried polyester is heated to approximately 170° F. after which the bifunctional reactant containing the desired pendant unsaturation is added. Here the amount of bifunctional reactant added will depend upon the desired degree of pendant unsaturation to be built into the finished polymer. The diisocyanate is then added with the reaction mixture being constantly stirred and heated slowly to a temperature of approximately 200° F. over a period of time varying from 10 to 40 minutes. The reaction mixture is then poured into the coated tray or mold and heated in the oven for the length of time and at the temperature indicated for the other types of unvulcanized elastomer described above.

If the sulfur-curable reaction product is to be used as a coating, a film or a molding composition, it is advantageous to retain it in its liquid or meltable state rather than to form the unvulcanized solid elastomer. This is accomplished simply by eliminating the oven bake of the reaction product. Instead, curing agents, accelerators, and other compounding ingredients may be added to and blended with the initial liquid reaction product, which can then be stored indefinitely at room temperature and used in liquid form for coatings, films, or molded items.

The specific times and temperatures employed in preparing the reaction products of this invention may be varied over relatively wide limits, depending upon the rates of reaction of the specific materials used. Catalysts may be added to the reaction mixture or, preferably, may be carried into the reaction mixture by the polyester since many catalysts function not only in the esterification reaction taking place to produce the polyester but also in the chain extension reaction between the polyester and the diisocyanate which produces the unvulcanized elastomers of this invention. Particularly effective catalysts for both the esterification and chain extension reactions are magnesium oxide and the titanate compounds formed by the reaction of titanic acid esters with polyhydroxy, polycarboxylic and hydroxy carboxylic organic compounds. These titanates are described in copending application Serial Number 596,419, filed July 9, 1956, in the name of Aleksander Piirma. The ethylene glycol titanates in particular are preferred catalysts for the preparation of the elastomeric products of this invention. As is usual, the amount of catalyst employed is small—in the range of from 0.002 to 0.2 part by weight based on 100 parts by weight to total reactants with a preferred range being from 0.005 to 0.02 part per 100.

To insure a homogeneous product and to prevent the formation of a relatively soft "skin" on the surface of the unvulcanized rubber, it has sometimes been found desirable to cover the mold into which the liquid, partially-reacted polymer is poured, with an aluminum tray for instance in order to insure the exclusion of atmospheric moisture from contact with the exposed surface of the reaction mixture. If this precaution is not taken, the rubbers produced are not of the same plasticity from the top to the bottom, it being observed that a skin of soft rubber is formed at the exposed surface during the baking operation. This soft rubber not only detracts from the homogeneous nature of the rubber produced but also presents a problem in the milling of the unvulcanized rubber because the softer rubber tends to stick to and can be removed only with difficulty from the mill rolls.

The practice of this invention is further illustrated by the following examples in which, unless otherwise specified, parts are shown by weight. The invention is not intended to be limited by these examples which are illustrative rather than restrictive of the scope of this invention.

*Example 1*

A polyester was prepared from the condensation reaction of 3212 parts of adipic acid, 1480 parts of ethylene glycol and 348 parts of glycerol-alpha-allyl ether. This polyester prepared with an approximately 20% excess of glycol had an acid number of 0.9, an hydroxyl number of 58.5 and an average molecular weight of 1890. The polyester (1700 parts) was mixed with 238.5 parts of 4,4'-tolidine diisocyanate of 100% purity. The mixture was heated gradually to approximately 100° C. over a period of 20 minutes after which 8.5 parts of phenyl-beta-naphthylamine was added. The mixture was then baked in an oven for 1¼ hours at 110° C. Plasticity tests run on the resulting rubber showed an Olsen flow of 352. The rubber (100 parts) was mixed on a rubber mill with 4 parts mercaptobenzothiazyl disulfide, 1 part mercaptobenzothiazole, 2 parts sulfur and 20 parts high abrasion furnace black. Sheets of the compounded rubber were cured for 90 minutes at 290° F. Tests run on the cured rubber showed the following properties:

Tensile strength_____ 4400 pounds per square inch.
Elongation at break_____ 570 percent.
Modulus at 300% elongation__ 2200 pounds per square inch.
Shore A durometer hardness__ 63.

*Example 2*

A polyester was prepared from the condensation reaction of one mol of adipic acid and 1.20 mols of ethylene glycol. This polyester prepared with an approximately 20% excess of glycol had an acid number of 0.8, an hydroxyl number of 52.8 and an average molecular weight of 2100. The polyester (1220 parts) was mixed with 208 parts of 2,4-tolylene diisocyanate of 100% purity. The mixture was heated gradually to approximately 100° C. over a period of 60 minutes after which it was permitted to cool. The resulting isocyanate-terminated prepolymer (1389 parts) was mixed with 72.5 parts of glycerol-alpha-allyl ether and heated at 100° C. The mixture was then baked in an oven for 45 minutes at 120° C. Plasticity tests run on the resulting rubber showed an Olsen flow of 300. The rubber (100 parts) was mixed on a rubber mill with 4 parts mercaptobenzothiazyl disulfide, 1 part mercaptobenzothiazole and 2 parts sulfur. Sheets of the compounded rubber were cured for 180 minutes at 290° F. Tests run on the cured rubber showed the following properties:

Tensile strength_____ 4300 pounds per square inch.
Elongation at break_____ 580 percent.
Modulus at 300% elongation__ 300 pounds per square inch.
Shore A durometer hardness__ 52.

*Example 3*

A polyester was prepared from the condensation reaction of one mol of adipic acid, 0.96 mol of ethylene glycol and 0.24 mol of propylene glycol-1,2. This polyester prepared with an approximately 20% excess of glycol had an acid number of 0.5, an hydroxyl number of 59.5 and an average molecular weight of 1870. The polyester (1000 parts) was mixed with 284 parts of 4,4'-tolidine diisocyanate of 99.5% purity. The mixture was heated gradually to approximately 100° C. over a period of 90 minutes after which it was permitted to cool. The resulting isocyanate-terminated prepolymer (538.5 parts) was mixed with 20 parts of erythrol and heated for 14 minutes at 100° C. The mixture was then baked in an oven for 3½ hours at 120° C. Plasticity tests run on the resulting rubber showed an Olsen flow of 176. The rubber (100 parts) was mixed on a rubber mill with 4 parts mercaptobenzothiazyl disulfide, 1 part mercaptobenzothiazole and 2 parts sulfur. Sheets of the compounded rubber were cured for 120 minutes at 300° F. Tests run on the cured rubber showed the following properties:

Tensile strenth_____ 5800 pounds per square inch.
Elongation at break_____ 800 percent.
Modulus at 300% elongation___ 350 pounds per square inch.
Shore A durometer hardness____ 57.

*Example 4*

A polyester was prepared from the condensation reaction of one mol of adipic acid, 0.96 mol of ethylene glycol and 0.24 mol of propylene glycol-1,2. This polyester prepared with an approximately 20% excess of glycol had an acid number of 0.5, an hydroxyl number of 59.5 and an average molecular weight of 1870. The polyester (1500 parts) was mixed with 401.5 parts of 4,4'-diphenyl methane diisocyanate of 100% purity. The mixture was heated gradually to approximately 100° C. over a period of 75 minutes after which it was permitted to cool. The resulting isocyanate-terminated prepolymer (439.4 parts) was mixed with 25 parts of glycerol-alpha-allyl ether and heated for 14 minutes at 100° C. The mixture was then baked in an oven for 16 hours at 120° C. Plasticity tests run on the resulting rubber showed an Olsen flow of 126. The rubber (100 parts) was mixed on a rubber mill with 4 parts mercaptobenzothiazyl disulfide, 1 part mercaptobenzothiazole and 2 parts sulfur. Sheets of the compounded rubber were cured for 120 minutes at 300° F. Tests run on the cured rubber showed the following properties:

Tensile strenth_____ 4850 pounds per square inch.
Elongation at break_____ 500 percent.
Modulus at 300% elongation___ 775 pounds per square inch.

*Example 5*

A polyester was prepared from the condensation reaction of 1 mol of adipic acid, 0.96 mol of ethylene glycol and 0.24 mol of propylene glycol-1,2. This polyester prepared with an approximately 20% excess of glycol had an acid number of 0.5 and an hydroxyl number of 59.5 and an average molecular weight of 1870. This polyester (1800 parts) was mixed with 511.3 parts of 4,4'-tolidine diisocyanate having a purity of 99.5%. The mixture was heated gradually to approximately 100° C. over a period of 85 minutes after which it was permitted to cool. The resulting isocyanate-terminated prepolymer (99.5 parts) was mixed with 21.5 parts of bis hydroxyethyl allyloxy succinate and heated for 18 minutes at 100° C. The mixture was then baked in an oven at 120° C. for 5½ hours. Plasticity tests run on the rubber resulting showed an Olsen flow of 154. The rubber (100 parts) was mixed on a rubber mill with 4 parts mercaptobenzothiazyl disulfide, 1 part mercaptobenzothiazole and 2 parts sulfur. Sheets of the compounded rubber were cured for 60 minutes at 300° F. Tests run on the cured rubber showed the following properties:

Tensile strenth_____ 3950 pounds per square inch.
Elongation at break_____ 715 percent.
Modulus at 300% elongation___ 225 pounds per square inch.
Shore A durometer hardness____ 54.

*Example 6*

A polyester was prepared from the condensation reaction of one mol of adipic acid, 0.96 mol of ethylene glycol and 0.24 mol of propylene glycol-1,2. This polyester prepared with an approximately 20% excess of glycol had an acid number of 0.5, an hydroxyl number of 59.5 and an average molecular weight of 1870. The polyester (1000 parts) was mixed with 186.3 parts of 2,4-tolylene diisocyanate of 100% purity. The mixture was heated gradually to approximately 100° C. over a period of 85 minutes after which it was permitted to cool. The resulting isocyanate-terminated prepolymer (312.5 parts) was mixed with 20 parts of glycerol-alpha-allyl ether and heated for 26 minutes at 100° C. The mixture was then baked in an oven for 25 hours at 120° C. Plasticity tests run on the resulting rubber showed an Olsen flow of 91. The rubber (100 parts) was mixed on a rubber mill with 4 parts mercaptobenzothiazyl disulfide, 1 part mercaptobenzothiazole and 2 parts sulfur. Sheets of the compounded rubber were cured for 120 minutes at 300° F. Tests run on the cured rubber showed the following properties:

Tensile strenth_____ 5500 pounds per square inch.
Elongation at break_____ 725 percent.
Modulus at 300% elongation___ 350 pounds per square inch.
Shore A durometer hardness____ 58.

*Example 7*

A polyester was prepared from the condensation reaction of 1 mol of adipic acid, 0.96 mol of ethylene glycol and 0.24 mol of propylene glycol-1,2. This polyester prepared with an approximately 20% excess of glycol had an acid number of 0.5, an hydroxyl number of 59.5 and an average molecular weight of 1870. This polyester (1800 parts) was mixed with 511.3 parts of 4,4'-tolidine diisocyanate having a purity of 99.5%. The mixture was heated gradually to approximately 100° C. over a period of 85 minutes after which it was permitted to cool. The resulting isocyanate-terminated prepolymer (400 parts) was mixed with 78.4 parts of bis hydroxyethyl n-octenyl succinate and heated for 24 minutes at 100° C. The mixture was then baked in an oven for 11 hours at 120° C. Plasticity tests run on the resulting rubber showed an Olsen flow of 80. The rubber (100 parts) was mixed on a rubber mill with 4 parts mercaptobenzothiazyl disulfide, 1 part mercaptobenzothiazole, 2 parts sulfur and 15 parts high abrasion furnace black. Sheets of the compounded rubber were cured for 120 minutes at 290° F. Tests run on the cured rubber showed the following properties:

Tensile strength_____ 3800 pounds per square inch.
Elongation at break_____ 700 percent.
Modulus at 300% elongation_____ 700 pounds per square inch.
Shore A durometer hardness_____ 60.
Abrasion_____ 8.5 cubic centimeters per 20 minutes.

*Example 8*

A polyester was prepared from the condensation reaction of one mol of adipic acid, 0.96 mol of ethylene glycol and 0.24 mol of propylene glycol-1,2. This polyester, prepared with a 20 mol percent excess of glycol, had an acid number of 0.3, an hydroxyl number of 59.5 and an average molecular weight of 1880. This polyester (1500 parts) was mixed with 401.5 parts of 4,4'-diphenyl methane diisocyanate and heated gradually to 120° C. for 1¼ hours after which it was permitted to cool. The resulting isocyanate-terminated prepolymer (527.4 parts) was mixed with 20 parts of erythrol and heated gradually to 100° C. over a 17 minute interval after which it was poured into a pan and baked in an oven for 5¼ hours at 120° C. The resulting rubber (100 parts) was mixed with 4 parts mercaptobenzothiazyl disulfide, 1 part mercaptobenzothiazole and 2 parts sulfur. Sheets of the compounded rubber were cured for 180 minutes at 300° F. Tests showed the cured rubber had the following properties:

Tensile strength_____ 6500 pounds per square inch.
Elongation at break_____ 650 percent.
Modulus at 300% elongation_____ 375 pounds per square inch.
Shore A durometer hardness_____ 67.

*Example 9*

A polyester was prepared from the condensation reaction of one mol of adipic acid, 0.96 mol of ethylene glycol, and 0.24 mol of propylene glycol-1,2. This polyester, prepared with an approximately 20 mol percent excess of glycol, had an acid number of 0.5, an hydroxyl number of 58.1 and an average molecular weight of approximately 1920. This polyester (1196.3 parts) was mixed with 332.6 parts of 4,4'-tolidine diisocyanate having a purity of 99.3%. The mixture was heated gradually to approximately 100° C. for one hour after which it was permitted to cool. The resulting isocyanate-terminated prepolymer (1,494.6 parts) was mixed with 62.5 parts of allyl ethylene glycol and heated for 10 minutes at 100° C. after which 3.9 parts of phenyl-beta-naphthylamine were added and heating continued for 5 minutes. The mixture was poured into a pan and baked in an oven for 7½ hours at 100° C. The resulting rubber was placed on a mill and blended with 3.6 parts of ethyl para-amino benzoate. Plasticity tests run on the rubber showed an Olsen flow of 180. The rubber (100 parts) was mixed on a rubber mill with 4 parts mercaptobenzothiazyl disulfide, one part mercaptobenzothiazole, 2 parts sulfur and 20 parts of high abrasion furnace black. Sheets of the compounded rubber were cured for 120 minutes at 300° F. Tests run on the cured rubber showed the following properties:

Tensile strength_____ 4600 pounds per square inch.
Elongation at break_____ 620 percent.
Modulus at 300% elongation_____ 1600 pounds per square inch.
Shore A durometer hardness_____ 69.
Abrasion_____ 2.5 cubic centimeters per 20 minutes.

*Example 10*

A polyester was prepared from the condensation reaction of one mol of adipic acid, 0.96 mol of ethylene glycol, and 0.24 mol of propylene glycol-1,2. This polyester prepared with an approximately 20 mol percent excess of glycol had an acid number of 0.9, an hydroxyl number of 56.6 and an average molecular weight of approximately 1950. To the polyester was added 0.01% by weight of magnesium oxide followed by heating the mixture at 120° C. for 30 minutes. The polyester (800 parts) was mixed with 59.5 parts of bis-(hydroxyethyl) allyl amine. To this mixture was added 214.1 grams of 4,4'-tolidine diisocyanate of 99.2% purity. The complete reaction mixture was heated gradually for 30 minutes to 90° C. after which 2.7 parts of phenyl-beta-naphthylamine were added. Heating was continued for 3 minutes after which the mixture was poured into a pan and baked in an oven for 2¾ hours at 100° C. The resulting rubber (1043 parts) was placed on a rubber mill and blended with 2.6 parts of ethyl para-amino benzoate. Plasticity tests run on the rubber showed an Olsen flow of 267. The rubber (100 parts) was mixed on a rubber mill with 4 parts mercaptobenzothiazyl disulfide, one part of mercaptobenzothiazole, 2 parts sulfur and 20 parts of high abrasion furnace black. Sheets of the compounded rubber were cured for 20 minutes at 275° F. Tests run on the cured rubber showed the following properties:

Tensile strength_____ 3800 pounds per square inch.
Elongation at break_____ 660 percent.
Modulus at 300% elongation_____ 1100 pounds per square inch.
Shore A durometer hardness_____ 63.
Abrasion_____ 4.45 cubic centimeters per 20 minutes.

*Example 11*

A polyester was prepared from the condensation reaction of 1 mol of adipic acid, 0.96 mol of ethylene glycol and 0.24 mol of propylene glycol-1,2. This polyester prepared with an approximately 20 mol percent excess of glycol had an acid number of 0.5, an hydroxyl number of 58.1 and an average molecular weight of approximately 1920. The polyester (364 parts) was mixed with 39 parts of N,N-diallyl melamine and heated gradually for 15 minutes to a temperature of 110° C. after which 100 parts of 4,4'-tolidine diisocyanate was added. Heating was continued for 3 minutes after which one part of phenyl-beta-naphthylamine was added. After 2 minutes of additional heating the mixture was poured into a pan and baked in an oven for 3 days at 100° C. Plasticity tests run on the rubber showed an Olsen flow of 121. The rubber (100 parts) was mixed on a rubber mill with 4 parts mercaptobenzothiazyl disulfide, one part mercaptobenzothiazole, 2 parts sulfur and 20 parts of high-abrasion furnace black. Sheets of the compounded rubber were cured for 60 minutes at 275° F. Tests run on the cured rubber showed the following properties:

Tensile strength_____ 1450 pounds per square inch.
Elongation at break_____ 540 percent.
Modulus at 300% elongation___ 1075 pounds per square inch.
Shore A durometer hardness____ 81.

*Example 12*

A polyester was prepared from the condensation reaction of one mol of adipic acid, 0.96 mol of ethylene glycol and 0.24 mol of propylene glycol-1,2. This polyester, prepared with a 20 mol percent excess of glycol, had an acid number of 0.2, an hydroxyl number of 56.5 and an average molecular weight of approximately 1985. The polyester (1248 parts) was mixed with 327 parts of 4,4'-tolidine diisocyanate having a purity of 99.5% and heated for 1 hour at 100° C. to 110° C. To the resulting isocyanate-terminated prepolymer (1547 parts) were added 130 parts of pentaerythritol diallyl ether. The mixture was heated to 100° C., poured into a pan, placed in an oven and heated for 12 hours at 120° C. Plasticity tests run on the rubber showed an Olsen flow of 91. The rubber (100 parts) was mixed on a rubber mill with 4 parts mercaptobenzothiazyl disulfide, 1 part mercaptobenzothiazole, 2 parts sulfur, and 20 parts of high abrasion furnace black. Sheets of the compounded rubber were cured for 120 minutes at 290° F. Tests showed the following properties:

Tensile strength_____ 4200 pounds per square inch.
Elongation at break_____ 430 percent.
Modulus at 300% elongation__ 2700 pounds per square inch.
Shore A durometer hardness__ 70.
Abrasion_____ 4.7 cubic centimeters per 20 minutes.

*Example 13*

A polyester was prepared from the condensation reaction of one mol of adipic acid, 0.96 mol of ethylene glycol and 0.24 mol of propylene-glycol-1,2. This polyester, prepared with a 20 mol percent excess of glycol had an acid number of 0.5, an hydroxyl number of 58.1 and an average molecular weight of 1920. This polyester (981 parts) was mixed with 274 parts of 4,4'-tolidine diisocyanate having a purity of 99.3%. The mixture was gradually heated to a temperature of 100° C. over a period of 35 minutes and maintained at 100° C. for an additional 30 minutes and then cooled. To 1236 parts of the resulting isocyanate-terminated prepolymer were added 71.8 parts of vinylcyclohexanediol. The mixture was heated gradually to 100° C. over a period of 25 minutes. When the reaction mixture reached a temperature of 90° C., 3.3 parts of phenyl-beta-naphthylamine were added. The mixture was poured into a silicone oil treated aluminum tray and baked for 6½ hours at 100° C. Plasticity tests run on the rubber showed an Olsen flow of 248. The rubber (100 parts) was mixed on a rubber mill with 4 parts mercaptobenzothiazyl disulfide, 1 part mercaptobenzothiazole, 2 parts sulfur and 20 parts of high abrasion furnace black. Sheets of the compounded rubber were cured for 180 minutes at 290° F. Tests on the cured rubber showed the following properties:

Tensile strength_____ 4600 pounds per square inch.
Elongation at break_____ 580 percent.
Modulus at 300% elongation__ 1700 pounds per square inch.
Shore A durometer hardness___ 70.
Abrasion_____ 1.5 cubic centimeters per 20 minutes.

*Example 14*

A polyester was prepared from the condensation reaction of a mixture containing 161 pounds of adipic acid, 78.5 pounds of ethylene glycol, 29.4 pounds of glycerol-alpha-allyl ether, 5.9 grams of magnesium oxide and 122 grams of phenyl-beta naphthylamine. This polyester prepared with an approximately 35% molar excess of glycol had an acid number of 0.5, an hydroxyl number of 61.8 and an average molecular weight of 1800. The polyester (40,000 parts) was mixed with 5,720 parts of 4,4'-tolidine diisocyanate. The mixture was heated gradually to approximately 172° F. for 7 minutes after which 50 parts of phenyl-beta-naphthylamine was added. The mixture was stirred for 3 minutes then poured into a tray and baked in an oven for 8 hours at 200° F. Plasticity tests run on the resulting elastomer showed a Mooney plasticity (large rotor) of 59. The rubber (100 parts) was mixed on a mill with 2.5 parts of zinc oxide, 1 part of stearic acid, 2 parts of mercaptobenzothiazyl disulfide, 1 part of mercaptobenzothiazole, 1 part of tellurium dimethyl dithiocarbamate and 2 parts sulfur. Sheets of the compounded rubber were cured for 20 minutes at 290° F. Tests run on the cured rubber showed the following properties:

Tensile strength_____ 4000 pounds per square inch.
Elongation at break_____ 515 percent.
Modulus at 300% elongation__ 2250 pounds per square inch.
Shore A durometer hardness__ 70.

*Example 15*

A polyester was prepared from the condensation reaction of 161 parts of adipic acid, 78.5 parts of ethylene glycol and 29.4 parts of glycerol-alpha-allyl ether in the presence of 0.005 part of magnesium oxide and 0.01 part of phenyl-beta-naphthylamine. This polyester prepared with an approximately 35% excess glycol had an acid number of 0.5, an hydroxyl number of 59.0 and an average molecular weight of 1870. The polyester (188.6 parts) was heated to 100° C. Over a period of five minutes the following ingredients were added: 4,4'-tolidine diisocyanate (26.4 parts), benzothiazyl disulfide (6.5 parts), sulfur (2.7 parts) and magnesium oxide (0.05 part). Heating was continued for an additional 30 minutes during which time the temperature rose to 125° C. The mixture was opaque when first formed but after a few minutes became almost completely transparent indicating homogeneous blending of the ingredients. A portion of the mixture was poured onto a metal plate, drawn into a thin film and placed on a hot plate at 160° C. After one hour the film was cured to a high strength, amber colored, elastomeric sheet. Another portion, poured into an aluminum tray, was heated for 90 minutes in an oven at 150° C. A tightly cured rubbery mass resulted.

In addition to the specific formulations disclosed in the examples above, the elastomeric reaction products of this invention can be compounded in various ways. Cure can be achieved either with sulfur or with peroxides. In general, the sulfur should be present in the formulation to the extent of from ½ to 8 parts by weight per 100 parts by weight of the elastomer. Various accelerator combinations can be employed to aid in the cure of these elastomers, it being generally observed that the required level of acceleration is somewhat higher for these elastomers than for natural rubber. It has also been noted that zinc oxide and stearic acid which are almost universally employed as curing aids for natural rubber are not always required to obtain the best physical properties in the elastomers of this invention.

Although the elastomers possess good tensile strength without pigment reinforcement, carbon black has proven to be a particularly effective reinforcing agent for improving the abrasion resistance of the cured polymer. While improvement has been found with as little as 3 parts carbon black by weight, 20 parts based on 100 parts by weight of rubber has proven to be particularly effective in this regard. Other compounding ingredients such as coloring agents, fillers, plasticizers, antioxidants and processing aids may be employed in compounding the elastomer of this invention. In general, it may be said that the compounding of these elastomers presents the same problems faced by the compounding of natural or synthetic rubber. The rubber chemist will vary the cure systems and other compounding ingredients in the manner best suited to bring out the physical properties desired in the product being made.

If the polymers are to be processed in liquid or melted form for coatings, films or molded products, the curing agents, accelerators, reinforcing pigments and other compounding ingredients can be added to and mixed with the liquid or melted polymer. In fact, even if a processible elastomer is to be made, it is sometimes desirable to add the compounding ingredients to the liquid reaction product before it forms the solid unvulcanized elastomer although the curing agents and accelerators should be added on a mix mill after the solid rubber is made if relatively high temperatures are to be employed during the baking step.

Curing temperatures can be varied from 250° F. to 350° F. but are preferably in the range of from 275° F. to 310° F., depending upon the level of acceleration employed. The cure times will vary from 10 minutes to 1 hour, it being understood that the higher curing temperatures will permit the development of the desired cured physical properties in the shorter cure times. A cure of 30 minutes at 290° F. is generally applicable to most of the elastomers of this invention.

The elastomeric reaction products prepared according to the practices of this invention are useful in manufacturing those products in which natural or synthetic rubber is presently used. In particular they may be used in fabricating tires, belts, hose, sheet packing, gaskets, molded goods, floor mats, dipped goods, sheeting, tank lining, soles, heels, covered rolls, and other mechanical and industrial goods.

While certain representative embodiments and details have been shown for the purpose of illustrating the invention, it will be apparent to those skilled in this art that various changes and modifications may be made therein without departing from the spirit or scope of the invention.

We claim:

1. The reaction product resulting from the reaction of (A) an organic diisocyanate free of ethylenic unsaturation, (B) the linear polymer prepared from the reaction of at least one dicarboxylic acid free of ethylenic unsaturation containing at least three carbon atoms and at least one bifunctional reactant selected from the group consisting of glycols and dithiols, said linear polymer having an acid number not greater than 5 and an average molecular weight of from 900 to 5000; and (C) a third ingredient defined by the formula

in which R is an organic radical inert with respect to the isocyanate groups, X and Y are selected from the group consisting of —OH; —COOH and —SH, and Z is a non-benzenoid aliphatic unsaturated radical selected from the group consisting of —CH=CH$_2$; —(CH$_2$)$_n$—CH=CH$_2$ in which $n$ is a whole number from 1 to 10;

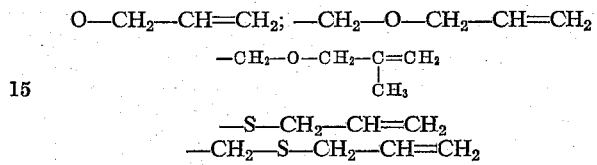

said third ingredient being employed in a sufficient amount to provide at least one pendant non-benzenoid aliphatic unsaturated radical for each 6000 units of molecular weight of said reaction product, the amount of organic diisocyanate employed being approximately molecularly equivalent to the sum of the molecular amounts of (B) and (C).

2. The reaction product as claimed in claim 1 in which C is glycerol-alpha-allyl ether.

3. The reaction product as claimed in claim 1 in which Z is said —(CH$_2$)$_n$—CH=CH$_2$ radical.

4. The elastomeric reaction product resulting from the reaction of approximately equal molecular amounts of (A) an organic compound defined by the formula

in which R is an organic radical inert with respect to the isocyanate groups, X and Y are selected from the group consisting of OH; —COOH and —SH and Z is a non-benzenoid aliphatic unsaturated radical selected from the group consisting of —CH=CH$_2$; —(CH$_2$)$_n$—CH=CH$_2$ in which $n$ is a whole number from 1 to 10;

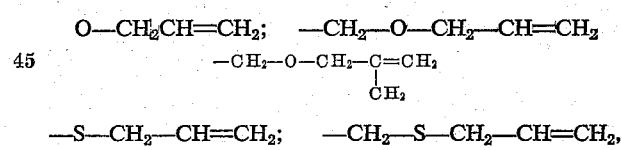

and (B) an isocyanate terminated linear polymer prepared from 2 mols of an organic diisocyanate free of ethylenic unsaturation, and 1 mol of a linear polymer prepared from the reaction of at least one dicarboxylic acid free of ethylenic unsaturation and containing at least 3 carbon atoms and at least one saturated bifunctional reactant selected from the group consisting of glycols and dithiols, said linear polymer having an acid number not greater than 5 and an average molecular weight of from 900 to 5000, the number of pendant unsaturated radicals in said elastomeric reaction product being at least 1 for each 6000 units of molecular weight.

5. The elastomeric reaction product defined by claim 4 in which (A) is glycerol-alpha-allyl ether.

6. The elastomeric reaction product defined by claim 4 in which Z is —(CH$_2$)$_n$CH=CH$_2$.

7. A liquid reaction product capable of being vulcanized resulting from the reaction of approximately equal molecular amounts of an organic diisocyanate free of ethylenic unsaturation and at least one linear polymer prepared from the reaction of (A) at least one dicarboxylic acid free of ethylenic unsaturation and containing at least 3 carbon atoms and (B) at least one complementary bifunctional reactant selected from the group consisting of glycols and dithiol, said linear polymer having an acid number not greater than 5 and an average molecular weight of from 900 to 5000, and (C) a third ingredient defined by the formula $$X-R-Y$$
$$\phantom{X-}|$$
$$\phantom{X-}Z$$

in which R is an organic radical inert with respect to the isocyanate groups, X and Y are selected from the group consisting of —OH; —COOH and —SH and Z is a radical selected from the group consisting of $$-CH=CH_2$$
$$-(CH_2)_n-CH=CH_2$$

in which $n$ is a whole number from 1 to 10;

$$-O-CH_2-CH=CH_2$$
$$-CH_2-O-CH_2-CH=CH_2$$
$$-CH_2-O-CH_2-C=CH_2$$
$$-S-CH_2-CH=CH_2$$
$$-CH_2-S-CH_2-CH=CH_2$$

said third ingredient being employed in amounts to provide at least one non-benzenoid aliphatic unsaturated radical for each 6000 units of molecular weight of said liquid reaction product, the amount of organic diisocyanate employed being approximately molecularly equivalent to the sums of (B) and (C).

8. The process for preparing elastomeric reaction products which comprises heating to a temperature of approximately 260° F. from 10 to 40 minutes a reaction mixture comprising (A) an organic diisocyanate free of ethylenic unsaturation, (B) a linear polymer prepared from the reaction of at least one dicarboxylic acid free of linear ethylenic unsaturation and containing at least three carbon atoms and at least one bifunctional reactant selected from the group consisting of glycols and dithiols, said linear polymer having an acid number not greater than 5 and an average molecular weight of from 900 to 5000 and (C) a third ingredient defined by the formula $$X-R-Y$$
$$\phantom{X-}|$$
$$\phantom{X-}Z$$

in which R is an organic radical inert with respect to the isocyanate groups, X and Y are selected from the group consisting of —OH; —COOH and —SH and Z is a non-benzenoid aliphatic unsaturated radical selected from the group consisting of —CH=CH$_2$; —(CH$_2$)$_n$—CH=CH$_2$ in which $n$ is a whole number from 1 to 10;

$$-O-CH_2-CH=CH_2$$
$$-CH_2-O-CH_2-CH=CH_2$$
$$-CH_2-O-CH_2-C=CH_2$$
$$\phantom{-CH_2-O-CH_2-C=}|$$
$$\phantom{-CH_2-O-CH_2-C=}CH_3$$
$$-S-CH_2-CH=CH_2$$
$$-CH_2-S-CH_2-CH=CH_2$$

said third ingredient being employed in a sufficient amount to provide at least one pendant non-benzenoid aliphatic unsaturated radical for each 6000 units of molecular weight of said reaction product, the amount of organic diisocyanate employed being approximately molecularly equivalent to the sum of the molecular amounts of (B) and (C), heating said reaction mixture at a temperature from 125 to 300° F. while protecting said reaction mixture from contact with the atmosphere to form said elastomeric reaction product.

9. The process for preparing elastomeric reaction products which comprises heating to a temperature of approximately 260° F. from 10 to 40 minutes in the presence of an ethylene glycol titanate catalyst a reaction mixture comprising (A) an organic diisocyanate free of ethylenic unsaturation, (B) a linear polymer prepared from the reaction of at least one dicarboxylic acid free of linear ethylenic unsaturation and containing at least three carbon atoms and at least one bifunctional reactant selected from the group consisting of glycols and dithiols, said linear polymer having an acid number not greater than 5 and an average molecular weight of from 900 to 5000 and (C) a third ingredient defined by the formula $$X-R-Y$$
$$\phantom{X-}|$$
$$\phantom{X-}Z$$

in which R is an organic radical inert with respect to the isocyanate groups, X and Y are selected from the group consisting of —OH; —COOH and —SH and Z is a non-benzenoid aliphatic unsaturated radical selected from the group consisting of —CH=CH$_2$; —(CH$_2$)$_n$—CH=CH$_2$ in which $n$ is a whole number from 1 to 10;

$$O-CH_2-CH=CH_2$$
$$-CH_2-O-CH_2-CH=CH_2$$
$$-CH_2-O-CH_2-C=CH_2$$
$$\phantom{-CH_2-O-CH_2-C=}|$$
$$\phantom{-CH_2-O-CH_2-C=}CH_3$$
$$-S-CH_2-CH=CH_2$$
$$-CH_2-S-CH_2-CH=CH_2$$

said third ingredient being employed in a sufficient amount to provide at least one pendant non-benzenoid aliphatic unsaturated radical for each 6000 units of molecular weight of said reaction product, the amount of organic diisocyanate employed being approximately molecularly equivalent to the sum of the molecular amounts of (B) and (C), heating said reaction mixture at a temperature from 125 to 300° F. while protecting said reaction mixture from contact with the atmosphere to form said elastomeric reaction product.

10. A sulfur-curable polyurethane solid reaction product resulting from the reaction of (A) an organic diisocyanate free of ethylene unsaturation, (B) a linear polymer prepared from the reaction of at least one dicarboxylic acid free of ethylenic unsaturation and containing at least 3 carbon atoms and at least one bifunctional reactant selected from the group consisting of glycols and dithiols, said linear polymer having an acid number not greater than 5 and an average molecular weight of from 900 to 5000 and (C) glycerol-alpha-allyl ether, said glycerol-alpha-allyl ether being employed in an amount to provide at least one non-benzenoid aliphatic unsaturated group for each 6000 units of molecular weight of said polyurethane reaction product, the amount of organic diisocyanate being approximately molecularly equivalent to the sum of the molecular amounts of (B) and (C).

11. The elastomeric reaction product of claim 1 wherein the third ingredient is 3-butene-1,2-diol.

References Cited in the file of this patent

UNITED STATES PATENTS

| | | |
|---|---|---|
| 2,424,884 | Cook et al. | July 29, 1947 |
| 2,806,835 | Nischk et al. | Sept. 17, 1957 |
| 2,808,391 | Pattison | Oct. 1, 1957 |
| 2,818,404 | Hill | Dec. 31, 1957 |
| 2,836,575 | Jones et al. | May 27, 1958 |
| 2,858,296 | Stilmar | Oct. 28, 1958 |
| 2,888,437 | Finelli et al. | May 26, 1959 |

FOREIGN PATENTS

| | | |
|---|---|---|
| 776,979 | Great Britain | June 12, 1957 |
| 863,403 | Germany | Jan. 19, 1953 |

OTHER REFERENCES

Phoenix, German application Ser. No. P11082, printed January 19, 1956 (K39b 2204), 4 p. spec., no drwg.

Farbenfabriken, German application Ser. No. F9661, printed April 26, 1956 (K39c–b), 4 p. spec., no drwg.

UNITED STATES PATENT OFFICE

CERTIFICATE OF CORRECTION

Patent No. 3,043,807                           July 10, 1962

Carl E. Snyder et al.

It is hereby certified that error appears in the above numbered patent requiring correction and that the said Letters Patent should read as corrected below.

Column 1, lines 14 and 15, strike out "which are capable of being cured by means of sulfur and"; column 4, line 3, after "minimum of" insert -- non-benzenoid aliphatic --; column 5, line 59, after "succinate," insert -- bis hydroxyethyl n-octenyl succinate, --.

Signed and sealed this 6th day of August 1963.

(SEAL)
Attest:

ERNEST W. SWIDER
Attesting Officer

DAVID L. LADD
Commissioner of Patents